United States Patent
Navulur et al.

(10) Patent No.: US 7,660,430 B2
(45) Date of Patent: Feb. 9, 2010

(54) METHOD AND APPARATUS FOR DETERMINATION OF WATER PERVIOUS SURFACES

(75) Inventors: Kumar Navulur, Longmont, CO (US); Dave Loomis, Loveland, CO (US); Charles Chaapel, Fort Collins, CO (US)

(73) Assignee: DigitalGlobe, Inc., Longmont, CO (US)

(*) Notice: Subject to any disclaimer, the term of this patent is extended or adjusted under 35 U.S.C. 154(b) by 883 days.

(21) Appl. No.: 10/908,695

(22) Filed: May 23, 2005

(65) Prior Publication Data

US 2006/0262963 A1 Nov. 23, 2006

(51) Int. Cl.
G06K 9/00 (2006.01)
(52) U.S. Cl. .................................. 382/100; 382/294
(58) Field of Classification Search ................ 382/100, 382/103, 113, 294; 348/144, 147
See application file for complete search history.

(56) References Cited

U.S. PATENT DOCUMENTS

| | | | |
|---|---|---|---|
| 4,682,300 A | 7/1987 | Seto et al. .................... 364/571 |
| 4,688,092 A | 8/1987 | Kamel et al. ................. 358/109 |
| 5,884,226 A | 3/1999 | Anderson et al. ............... 702/3 |
| 6,023,291 A | 2/2000 | Kamel et al. ................. 348/147 |
| 6,470,265 B1 | 10/2002 | Tanaka ....................... 701/208 |
| 6,504,502 B1 | 1/2003 | Wu et al. .................... 342/354 |
| 6,584,405 B1 | 6/2003 | Moncet .......................... 702/3 |
| 6,810,153 B2 | 10/2004 | Komura et al. .............. 382/295 |
| 6,819,798 B2 | 11/2004 | Gorin ......................... 382/207 |
| 6,834,125 B2 | 12/2004 | Woodell et al. ............. 382/274 |
| 6,909,815 B2 | 6/2005 | Bernstein et al. ............ 382/274 |
| 6,921,898 B1 | 7/2005 | Chen ......................... 250/340 |
| 7,283,909 B1 * | 10/2007 | Olsen et al. .................... 702/5 |
| 2002/0012071 A1 | 1/2002 | Sun ............................ 348/578 |
| 2002/0041328 A1 | 4/2002 | LeCompte et al. .......... 348/144 |
| 2003/0044085 A1 | 3/2003 | Dial, Jr. et al. ............. 382/293 |
| 2003/0152292 A1 | 8/2003 | Scott et al. .................. 382/298 |
| 2004/0120595 A1 | 6/2004 | Choi et al. ................... 382/254 |
| 2004/0153284 A1 | 8/2004 | Bernstein et al. ........... 702/178 |
| 2004/0264796 A1 | 12/2004 | Turner et al. ................ 382/254 |
| 2006/0041375 A1 * | 2/2006 | Witmer et al. .............. 701/208 |

(Continued)

OTHER PUBLICATIONS

Abbate et al., "Evaluation of Remote Sensing Data for Urban Planning, Applicative Examples by Means of Multispectral and Hyperspectral Data," IEEE Proc. 2$^{nd}$ GRSS/ISPRS Joint Workshop on "Data Fusion and Remote Sensing over Urban Areas", May 2003, pp. 201-205.*

(Continued)

*Primary Examiner*—Andrew W Johns
(74) *Attorney, Agent, or Firm*—Paul, Hastings, Janofsky & Walker LLP (57) ABSTRACT

A system and method for determining the pervious and impervious area within parcels associated with a municipality for purposes of generating bills for storm water runoff to parcel owners. Aerial imagery, collected from an aircraft and/or satellite, of the relevant municipality, or portion thereof, is collected, processed, and analyzed to determine the amount of water impervious area associated with each relevant parcel within the municipality. This information for each parcel may then be used to determine an appropriate amount of money to be charged to the owner of each respective parcel. The amount of impervious area per parcel is calculated based on parcel boundary information specific to the municipality that may contain spatial domain errors.

7 Claims, 5 Drawing Sheets

U.S. PATENT DOCUMENTS

2006/0126959 A1    6/2006    Padwick et al. ............ 382/254

OTHER PUBLICATIONS

"Sensor Specifications: lkonos," from NASA website: www.arc.nasa.gov/sge/health/sensor/sensors/ikonos.html, last updated Dec. 2003, 2 pages.*

Visual Learning Systems, Inc., "Using Feature Analyst™ for Land Cover and Land Use Mapping," a Visual Learning Systems, Inc. White Paper, Apr. 2004, web pages located at http://www.featureanalyst.com/feature_analyst/publications/white_papers/landcover_mapping.pdf, Visual Learning Systems, Inc.

M. Herold, S. Guenther, and K.C. Clarke, "Mapping Urban Areas in the Santa Barbara South Coast Using lkonos Data and eCognition," *eCognition Object Oriented Image Analysis: Application Note*, Mar. 2003, vol. 4, No. 1, Definiens Imaging GmbH, Germany.

Definiens Imaging, "Understanding the Power of eCognition Professional," *eCognition Professional 4.0*, web pages located at http://www.definiens-imaging.com/ecognition/pro/tour.htm, Definiens Imaging GmbH, Germany.

J. Batchelor and R.P. Martin, "Upper San Diego River Improvement Plan (USDRIP) Impervious Surface Mapping Remote Sensing Research 2002-2003," a report paper, web pages located at http://www.featureanalyst.com/feature_analyst/publications/success/san_diego.pdf, Visual Learning Systems, Inc.

Buchwitz et al., "A correlated-k distribution scheme for overlapping gases suitable for retrieval of atmospheric constituents from moderate resolution radiance measurements in the visible/near-infrared spectral region", J. Geophys. Res., 105, 15 247-15 262, 2000.

Eismann et al., "Application of the stochastic mixing model to hyperspectral resolution enhancement", IEEE Trans. Geosci. Remote Sens., vol. 42, No. 9, pp. 1924-1933, Sep. 2004.

Friedmann et al., "Multiple scene precision rectification of spaceborne imagery with very few control points", 1983, Photogrammetric Engineering and Remote Sensing, 49(12), pp. 1657-1667.

Higgs et al., "Operational Pass Processing of Landsat TM and SPOT HRV Imagery within the Canadian CEODesk Processor", In Proceedings of the Technical Commission II. Systems for data processing, analysis and representation, Cambridge, ISPRS, 1998.

Schott et al., "Incorporation of time-dependent thermodynamic model and radiation model into infrared three-dimensional synthetic image generation", Opt. Eng., vol. 37, No. 7, p. 1505, Jul. 1992.

Sharpe et al., "Reduction of ground control requirements by pass processing", In Proceedings of the XVI International Congress of the ISPRS, 1988, vol. 27, Part B4, pp. 350-357.

Sharpe et al., "Reduction of ground control requirements for SPOT imagery by pass processing", In Proceedings of IGARSS, 1989, vol. 1, pp. 142-145.

International Written Opinion from Application No. PCT/US05/046749 dated Dec. 24, 2007.

Austrailian Search Report and Written Opinion from Application No. SG200608775-3 dated Jan. 25, 2008.

Australian Written Opinion from Application No. SG200608775-3 dated Sep. 24, 2008.

Non-final Office Action from U.S. Appl. No. 10/905,042 mailed Nov. 12, 2008.

International Search Report from Application No. PCT/US05/046749 dated Nov. 19, 2006.

International Search Report and Written Opinion from Application No. PCT/US05/022961 dated Oct. 30, 2007.

Non-final Office Action from U.S. Appl. No. 10/908,695 mailed Mar. 13, 2009.

Non-final Office Action from U.S. Appl. No. 11/571,293 mailed Dec. 30, 2008.

Padwick. C., et al., "Automatic Contrast Enhancement of QuickBird Imagery", Jun. 10, 2004, presented at ASPRS annual meeting. DigitalGlobe Tech Notes.

Non-final Office Action from U.S. Appl. No. 11/571,293 mailed Aug. 13, 2008.

* cited by examiner

METHOD AND APPARATUS FOR DETERMINATION OF WATER PERVIOUS SURFACES

FIELD OF THE INVENTION

The present invention is directed to determination of water pervious/impervious surfaces, and, more specifically, to analysis of aerial and/or satellite imagery to determine water pervious/impervious surfaces of objects within the imagery.

BACKGROUND OF THE INVENTION

One significant area of environmental concern affecting many urban areas of the United States and many other developed countries is the impact of storm water runoff on surface water quality. In the United States, since March 2003, the Clean Water Act National Pollution Discharge Elimination System (NPDES) Program requires communities to manage the quantity and quality of storm water runoff. Such storm water runoff may originate, for example, from parking lots, roads, building roofs, sidewalks, and other surfaces that contain many types of pollutants. Such surfaces are referred to herein as impervious surfaces. Storm water runoff may contain sediment and pollutants that have adverse impacts on downstream users of the water. For example, storm water runoff from the surface of a parking lot, street, and/or driveway may contain petroleum impurities, such as from oil leaks of vehicles parked at the lot and the parking lot surfacing material. The storm water runoff may also contain potentially harmful chemicals, such as ethylene glycol (anti-freeze), and particulates from various gravel, sand, litter, and tire rubber. Runoff from such surfaces, if left untreated, may find its way into streams, rivers, lakes, and/or groundwater supplies and have an adverse impact on users (including wildlife) of the water supplies. Accordingly, the NPDES requires communities to manage such runoff.

In order to comply with federal regulations, many municipalities and local government agencies are forming, or have formed, storm water utilities to address the increasing fiscal burden of meeting many of the water quality regulatory requirements. Many of these storm water utilities generate bills for property owners within the municipality based on the impervious surface area owned by the property owner. The generation of parcel maps and the determination of pervious/impervious surface area contained within each parcel can be a significant task for such storm water utilities. Such utilities generally have a limited budget, and thus limited resources available to accomplish these tasks. Furthermore, with continuing development, both in existing developed areas and new developments, maintaining a complete and up-to-date parcel map, along with the determination of pervious/impervious surfaces, is a continuing challenge for many communities.

SUMMARY OF THE INVENTION

The present invention is directed to a system and method for determining the pervious and impervious area within parcels associated with a municipality. Imagery of the relevant municipality, or portion thereof, is collected, processed, and analyzed to determine the amount of impervious area associated with each relevant parcel within the municipality. This information for each parcel may then be used to determine an appropriate amount of money to be charged to the owner of each respective parcel.

One embodiment of the invention provides a method for determining pervious and impervious surfaces within parcels of a municipality. The method includes the steps of (a) obtaining a parcel map of a municipality; (b) obtaining an image of the municipality; (c) warping the image such that ground locations of the warped image correspond to ground locations of the parcel map; and (d) analyzing spectral and/or spatial information from the image to determine pervious surfaces. The parcel map may have corresponding GIS information that is different than GIS information from the image. The image may include multiple spectral bands of imagery data, such as a red band, a green band, a blue band, and a NIR band. The step of analyzing spectral and/or spatial information, in an embodiment, includes (i) classifying a group of pixels from within the image as an object; (ii) classifying the object as pervious or impervious; (iii) determining an area of the object; (iv) determining a total area associated with a parcel; (v) determining other objects within the parcel; and (vi) determining a total area of impervious surfaces within the parcel. The object may be classified using spectral information.

This information may be used in a number of ways. In an embodiment, a determination is made, for each parcel, of an area of pervious surface and a total area. The percentage of total parcel area that is impervious is calculated, and percentage information per parcel provided to the municipality. In another embodiment, satellite imagery from a previous time period is obtained. This previous satellite image is warped to a parcel map provided by the municipality and analyzed to determine pervious surfaces. The pervious surfaces between the previous satellite image and a recent satellite image may then be compared to determine, for each parcel, a change in pervious surfaces. Parcels having a change greater than a predetermined percentage may be flagged for further processing, including automated or manual processing.

Another embodiment of the invention provides a parcel map of a municipality, comprising an image of parcels and an image of impervious surfaces related to each parcel. The impervious surfaces are determined by: (a) obtaining a satellite image of the municipality; (b) warping the image such that ground locations associated with the image correspond with ground locations associated with the parcels; and (c) analyzing the image to determine impervious surfaces. Ground locations of parcels may be different than ground locations of the satellite image. An area of pervious surface and a total area of each parcel is determined, and a percentage is calculated of total parcel area that is impervious for each parcel, with the percentage per parcel provided to a customer.

Yet another embodiment of the invention provides a transmission medium comprising data related to pervious surfaces for each of a plurality of parcels in a municipality, the data obtained from: (a) a satellite image having a first set of ground coordinates; (b) a parcel map having a second set of ground coordinates, the second set of ground coordinates different than the first set of ground coordinates; (c) warping the satellite image to correspond to the second set of ground coordinates; and (d) analyzing the image to determine pervious surfaces associated with each the plurality of parcels.

In still a further embodiment, the present invention provides a system for determining an assessment for a plurality of parcels within a municipality for storm water runoff. The system comprises (a) an image processing unit capable of processing information from an image to determine areas within the image that are impervious; (b) an image warping unit capable of comparing ground coordinates associated with a parcel map for the municipality with ground coordinates associated with the image and warping the image such that the warped image ground coordinates correspond to the parcel map; (c) a pervious surface calculating unit capable of calculating a percentage of pervious area per parcel; (d) an assessment calculating unit capable of calculating an assessment per parcel according to the percentage; and (e) wherein the image is warped before being analyzed. The image warping unit, in an embodiment, is capable of determining ground coordinates of the image and adjusting the ground coordinates to correspond to the parcel map.

DETAILED DESCRIPTION

As mentioned above, storm water runoff can be a significant pollution source for surface water in and around particular communities and municipalities. In order to comply with federal regulations directed to surface water quality, and the impact of storm water runoff, many municipalities have installed storm water management systems. Such systems may detain storm water to, for example, prevent flooding, allow suspended sediment to settle and filter pollutants. In many municipalities, storm water utilities have been formed to install and maintain such systems. Some storm water utilities bill property owners within the municipality for the costs of installing and maintaining storm water management systems. Billing of property owners may be done using various methods, with many storm water utilities billing property owners based on the actual size of the property and/or the total impervious surface area contained within the property. In such cases, each storm drainage bill is calculated by mapping the impervious area within a parcel to determine the area of the parcel that is impervious. A percentage of impervious surface in relation to the total of the parcel may also be calculated in cases where the fee is calculated based on such a percentage. This impervious area, percentage of impervious area on the property, and/or the total property size, is used to determine the bill for each particular property owner. One common billing method is to generate a billing structure that has price increments for each 100 square feet of impervious area as a percentage of total parcel area. Such a billing method takes into consideration the amount of storm water runoff from impervious surfaces that is likely to be absorbed by the other pervious area within the parcel.

Another billing method bills a property owner based on the total area of impervious surface on a property. Such a method may have a flat rate per square foot (square meter) of impervious area, such as $0.001/ft$^2$/month. In such a case, a property having 1,500 square feet of impervious area would have a monthly fee of $1.50. Many storm water utilities bill property owners annually, resulting in an annual charge, for this example, of $18.00. While such a method for billing provides a uniform charge per unit area across the municipality, it may result in an inaccurate fee in the event that the impervious area of a property is not accurately calculated. For example, if a portion of a property is inaccurately classified as impervious, when in fact that area is pervious, the property owner is charged an incorrect fee. Some municipalities reduce the possible errors in storm water bills by having a tiered rate structure based on the total impervious area on a property. In such a system, single family residential properties may have three tiers of rates:

| Tier | Impervious Area (ft$^2$) | Rate/month |
|---|---|---|
| 0 | 0-600 | $0.00 |
| 1 | 600-1,999 | $1.50 |
| 2 | 2,000-2,899 | $2.70 |
| 3 | 2,900+ | $3.90 |

In this example, only properties having an error in impervious area resulting in the placement of the property into the wrong tier result in a customer being billed an incorrect amount. Furthermore, some municipalities may place all properties having a total impervious area within a predetermined percentage (e.g. 5%) of impervious area cutoffs into the lower tier for storm water billing purposes. Thus, the likelihood of a property owner being over-charged is further reduced. Billing multi-family residential, commercial, and/or industrial property may be accomplished in a similar fashion with equivalent rates, or increased rates relative to single family residential.

As will be understood, the generation of parcel maps and the analysis of the area within each parcel of the parcel map can consume significant resources. Furthermore, such maps need to be updated when a property has a change, such as the building of a garage, which has an effect on the total impervious surface contained within the property. Furthermore, in municipalities that are experiencing growth with the development of new residential and/or commercial sites at locations that had been previously undeveloped, new storm water infrastructure must be constructed in these areas. Similarly, many communities have urban infill projects in which a previous commercial, industrial, municipal, or military site within the community is re-developed with a different use. For example, a former military base within a community may be re-developed into a mixed-use area, containing residential, commercial, and/or other types of properties. New customers must also be determined by generation of a new parcel map and determination of impervious surface within each parcel. It is important to add new residences and businesses to the storm water billing system in a timely manner in order to generate budget and cost recovery projections for the construction of storm water infrastructure.

The present invention recognizes that mapping of significant sized development areas represents a significant source of revenue for such storm water utilities. The present invention provides an efficient way to generate such parcel maps and determine the amount of impervious area within parcels using satellite and/or other aerial imagery. This information is then provided to a storm water utility, which may use this information directly to generate bills for storm water runoff customers. Furthermore, incorporation of new information related to changed use for particular parcels, such as the building of a new garage or the removal of an existing garage on a residential property, is important for such utilities in order to provide customers with accurate bills. As with nearly any charges a municipality may require a property owner to pay, billing for storm water runoff charges generate complaints and challenges from property owners. Thus, the present invention provides relatively accurate and recent information that a storm water utility may rely on in justifying and/or adjusting a bill to a property owner.

Figure 1:
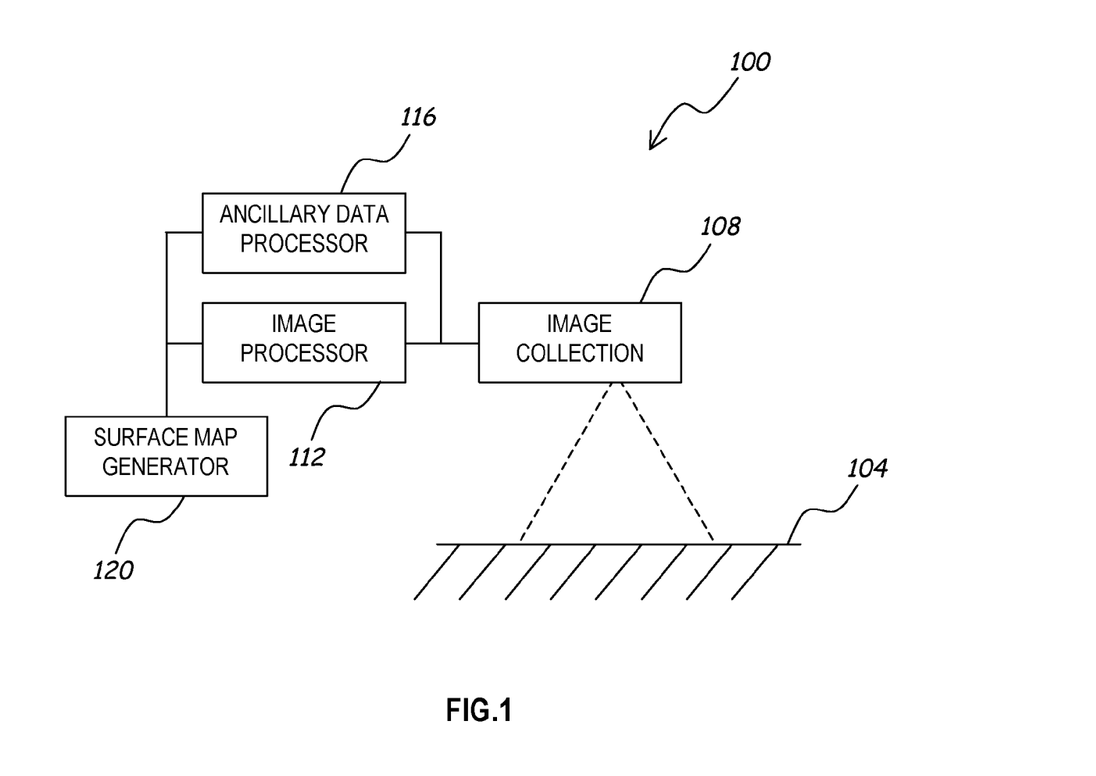
FIG. 1 is a block diagram illustration of the various components used to determine water permeable/impermeable surfaces of the embodiment of the invention.

Referring now to FIG. 1, a block diagram illustration of a system for collecting imagery is described. The system 100 collects images of the surface of the earth 104 with an image collection system 108. Such an image collection system 108 may include, for example, a satellite imaging system, and an imaging system carried on an aircraft. The image collection system 108, in an embodiment, collects several bands of imagery corresponding to portions of the spectrum of the received energy. Such bands, in one embodiment, include red (R), green (G), blue (B), and near infrared (NIR). Other bands of imagery may also be collected, such as, ultraviolet (UV), infrared (IR), and/or pan-chromatic (PAN), to name but a few. In one embodiment, the image collection system is an imaging satellite having a spatial resolution of approximately two feet and collecting four bands (R, G, B, NIR) of imagery. The imagery may be collected at any time, and in one embodiment the imagery is collected under "leaf-off" conditions. Leaf-off refers to the period of time where deciduous trees and plants have few or no leaves. Such leaf-off conditions provide enhanced viewing of items and surfaces beneath the leaf canopy of such trees and plants. This enhanced viewing of surfaces beneath the leaf canopy helps reduce errors in determination of pervious/impervious surfaces. For example, if a leaf canopy of a tree obstructs an aerial view of a roof of a structure beneath the tree, if imagery is collected when the tree has a leaf canopy, this area may be incorrectly classified as a pervious area when in fact a portion of the area is impervious. However, it is not necessary that imagery be collected under leaf-off conditions, and in some instances the presence of a leaf canopy may provide an effective increase in pervious area. A municipality may choose to classify impervious surfaces under such a leaf canopy as a pervious area, and imagery may be collected during time periods in which the leaf canopy is present. Utilizing a satellite, the surface may be mapped relatively quickly and inexpensively as compared to an imaging system mounted on an aircraft. Utilizing an aircraft, the surface may be mapped with increased resolution as compared to a satellite based imaging system. Thus, each type of imaging system has advantages and disadvantages, and some embodiments of the invention utilize both types of imaging systems.

An image processor 112 receives imagery data from the image collection system 108. In one embodiment, the image processor 112 performs various processing algorithms for data preparation. Such algorithms may include, for example, pan sharpening to create multi-spectral data sets, ortho-rectification, mosaicing, color balancing, and tiling. As will be understood, such image processing is typical of image processing on satellite and/or aircraft based imagery. The imagery data, and/or processed imagery data, in an embodiment, is also warped to custom parcel data provided by the municipality, enabling GIS analysis of the imagery using parcel data associated with the municipality. Such warping is advantageous in many situations where the parcel data for a municipality may not precisely correspond to location coordinate information that would normally accompany such imagery. For example, many municipalities have plat maps that were generated by hand, with location coordinates indicated on these maps being different from location coordinates that would be obtained if a surveyor were to go to the actual parcel boundary. Imagery provided by the imaging system generally includes such location information to a relatively high degree of accuracy. If such imagery were not warped to the parcel map information for the municipality, errors in the parcel boundary locations (referred to as "spatial domain" errors) may be present. Further, many plat maps for municipalities were created on paper that was then scanned into a municipality's database. Such scanning may also result in errors in the spatial domain for such plat maps. Warping such municipality parcel location data to the imagery enables the imagery to be analyzed on a parcel-by-parcel basis to provide data for each parcel using the same location information as used by the municipality.

In one embodiment, orthorectification is performed prior to any warping of the imagery. Such orthorectification accounts for elevation changes, and may use ground control points (GCPs) to accurately list the locations associated with the imagery with reference to a standard location system such as the North American Datum of 1983 (NAD83). As mentioned, plat maps associated with a particular municipality may have errors in the property boundaries in which the plat map shows a property boundary having a first location with respect to the spatial domain (such as NAD83), while the actual location of the property boundary is different from the first location. The warping to fit the image to the local database is then performed to compensate for such spatial domain errors.

Data from the image collection system is also provided to an ancillary data processor 116. In one embodiment, the ancillary data processor 116 receives the imagery data and other ancillary information which may be provided. Ancellary data may include, for example, National Land Cover Dataset (NLCD), road maps, and landuse/landcover datasets other than NLCD. These ancillary datasets might be in a different GIS format, projection, and/or datum, and therefore require GIS analysis to re-project and reformat data, to be compatible for analysis in the image processing system. For example, US census TIGER datasets may be incorporated into the imagery, and may need to be re-projected into state plane to match the municipality spatial database. In this embodiment, the ancillary data processor receives this data and the required GIS format for the municipality spatial database associated with the imagery data, and performs any required processing to re-project and reformat the ancillary data.

A surface map generator 120 receives the data from the image processor 112 and ancillary data processor 116 and generates a map identifying various impervious and pervious surfaces. The generation of such a map is described in further detail below. In one embodiment, the output of the surface map generator 120 is a binary raster showing pervious and impervious area within the region of interest, and also containing parcel data provided by the municipality. Such a surface map may then be used by the municipality to generate a parcel-by-parcel listing of pervious and impervious areas and impervious surface area per parcel, and/or a listing of impervious surface area as a percentage of total parcel area. The parcel-by-parcel listing may then be used to calculate a storm water runoff bill for the property owner for each parcel according to the billing method used by the particular municipality.

Figure 2:
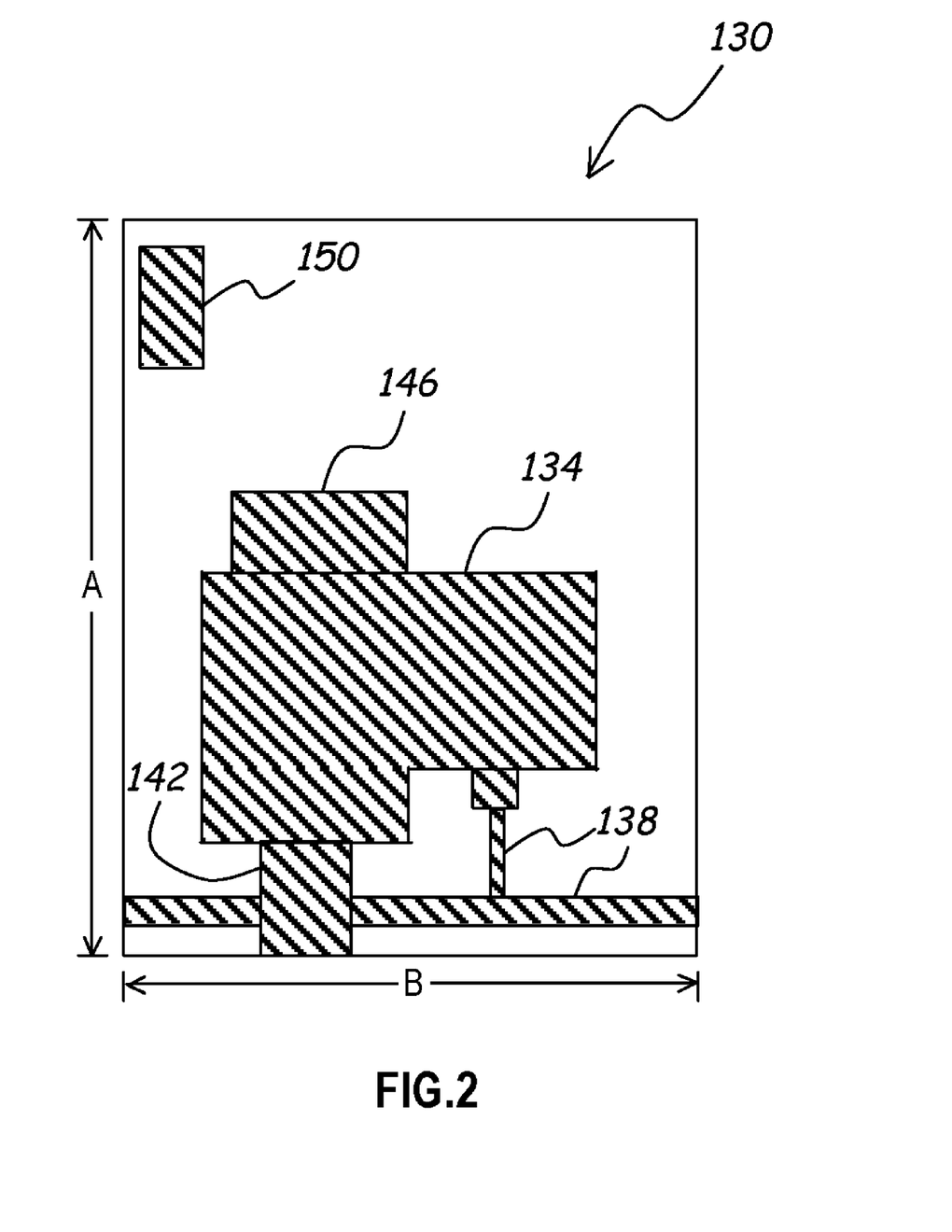
FIG. 2 is an illustration of a parcel and the pervious/impervious surface within the parcel.

Referring now to FIG. 2, an illustration of a particular parcel is described. In this illustration, a single parcel 130 contains both pervious and impervious surfaces. The impervious surfaces are identified by the hashed lines. The parcel has a length A feet (meters) and a width B feet (meters), thus giving the parcel 130 a total area of A times B square feet (square meters). The parcel may include, as illustrated in FIG. 2, a structure 134 such as a house, having associated sidewalks 138, driveway 142, patio 146, and outbuilding 150. Each of these structures and associated items is impervious to water, and are thus marked as impervious surfaces. The remainder of the parcel may be a grassy surface, such as lawn or garden, that is pervious to water. In one embodiment, the surface map generator analyzes each parcel and determines the total area for the parcel and the total area of the impervious features for each parcel. These areas may then be utilized by the municipality to determine the appropriate amount that the property owner for the parcel is to be charged. This determination may be made in one of a number of ways, including the example as described above. The parcel owner is then billed for surface water runoff based on the determination. The determination of pervious and impervious surfaces, in an embodiment, uses software that analyzes the different spectral bands of the imagery and makes analysis based on the spectral characteristics of the image to determine permeability and/or may analyze spatial characteristics of the imagery to determine permeability. The creation of such maps will be described in further detail below.

Figure 3:
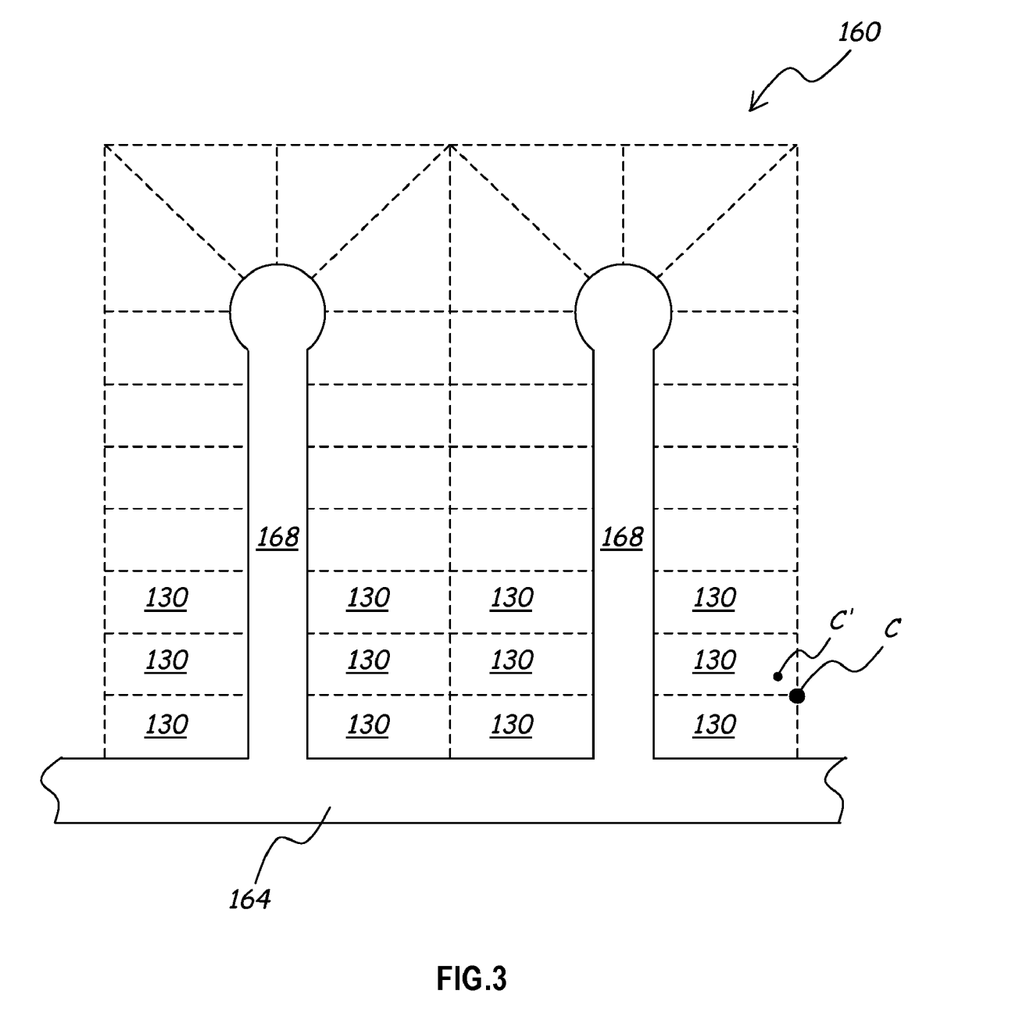
FIG. 3 is an illustration of a parcel map for a portion of a municipality.

Referring now to FIG. 3, a portion of a plat map 160 is illustrated. In this illustration, a road 164 having two side roads 168 with associated cul-de-sacs is illustrated, along with various parcels 130 associated therewith. As mentioned above, such a parcel map provided by a municipality may contain errors with respect to the parcel boundaries. For example, the location of a parcel boundary marked C, according to the plat, may be described in terms of longitude and latitude, or in terms of another grid coordinate system such as NAD83. This information may be incorporated into a municipality's GIS database. As is understood, a GIS (geographic information system) database includes various geographic aspects of a body of data. Such a database system enables various queries or analysis to be performed and provides results in the form of some type of map. Geographic information in such a system is described explicitly in terms of geographic coordinates, such as latitude, longitude, and/or a grid coordinate system (NAD83), or implicitly in terms of a street address, postal code, or forest stand identifier. A GIS system contains the ability to translate implicit geographic data (such as a street address) into an explicit map location. GIS developers sometimes obtain map data from public sources or companies, which may include such plat maps as illustrated in FIG. 3. As mentioned, a location C in the plat map may have some error in it with respect to the location as compared to a corresponding location that would be determined by, for example, a surveyor. In such a case, an unwarped map from an imaging system such as described above may list the location C' that is different than the location C contained in the plat map. Thus, as described above with respect to FIG. 1, the image processor may warp the imagery to conform to the data in the municipality's database. Such a warped image may be used when generating the surface map and doing image processing, and provide data per parcel that may be used directly by a municipality with little or no required post-processing. In the event that an unwarped image is used to generate the surface map and for image processing, data provided to a municipality must be corrected to compensate for any differences between the municipality's plat maps and the location associated with the imagery.

Figure 4:
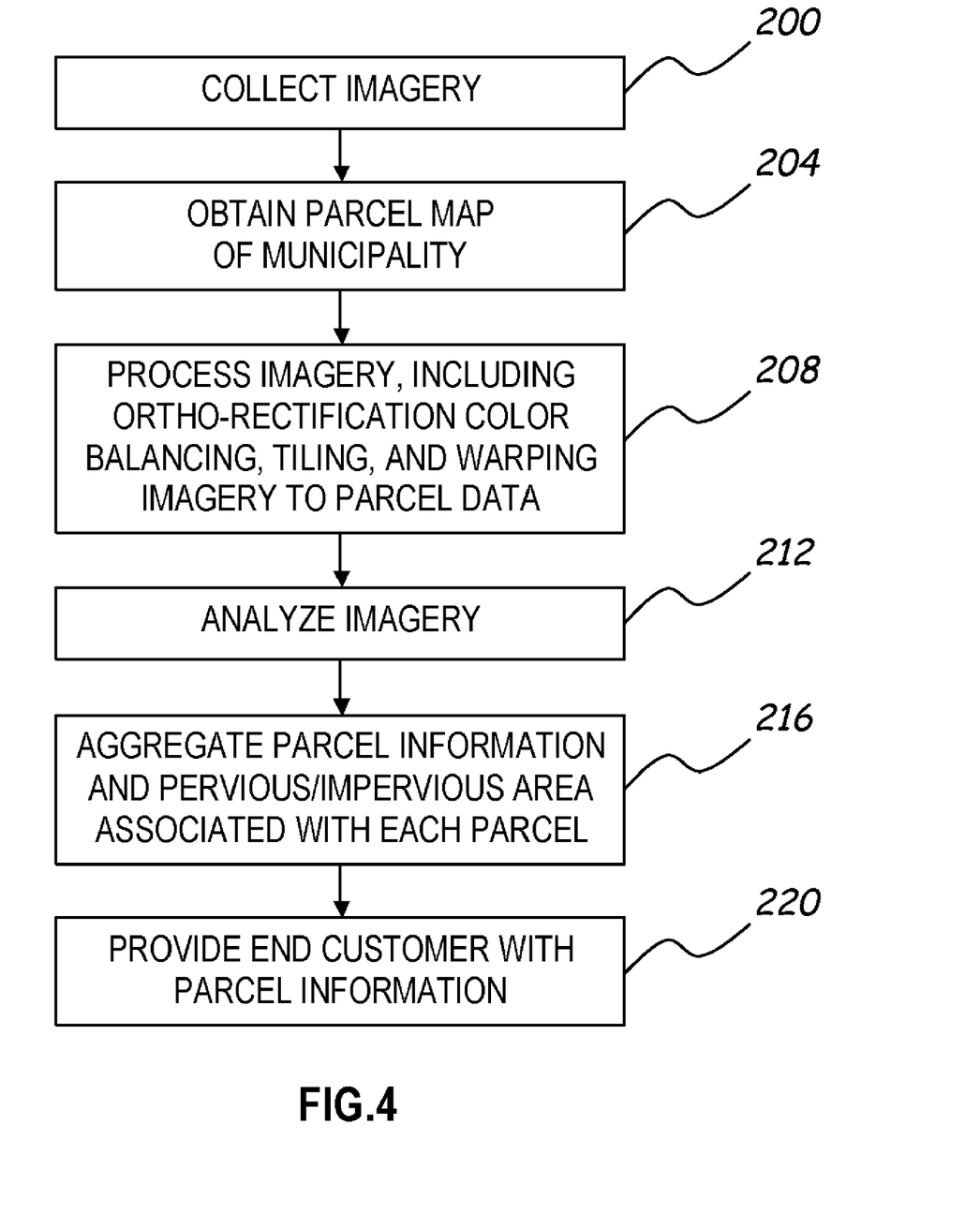
FIG. 4 is a block diagram illustration of the operational steps for determining parcels and the impervious surface area within parcels for an embodiment of the invention.

Referring now to FIG. 4, a flow chart diagram illustrating the operational steps of an embodiment of the invention is described. Initially, as indicated at block 200, imagery is collected. As described above, imagery may be collected using a satellite imagery system, and/or an aircraft based imagery system, to name two examples. At block 204, a parcel map of the municipality being imaged is obtained. The parcel map corresponds to the collected imagery. In one embodiment, imagery is collected at block 200 with a buffer of between 150 and 300 meters around the parcel map to be imaged to ensure the entire area of interest is imaged. The parcel map, as described above, may contain errors with respect to the spatial information of various parcels within the municipality. At block 208, imagery is processed. Such processing includes orthorectification, color-balancing, tiling, and warping the imagery to parcel data. Following the image processing, the imagery is analyzed at block 212. Imagery may be analyzed using spectral information, and/or spatial information, along with a set of rules. The rules are used to identify various impervious and pervious materials within the image based on the spectral and/or spatial information. The spatial analysis, in an embodiment, uses machine vision software to extract image objects, such as structures, roads, and sidewalks. Spectral analysis may include analysis of the spectral information provided by the imaging system, such as a visual of the NIR and blue bands, for example.

In one embodiment, a combination of spatial analysis and spectral analysis is performed on the image. In this embodiment, the process involves creating objects and segments from pixels in the image using homogenity and hetrogenity rules of the spectral behavior of pixels. The spectral information from a pixel is compared to the spectral information of neighboring pixels. If one or more neighboring pixels have similar spectral characteristics, the pixels having those characteristics are grouped together to create an object or segment. This process continues for all of the pixels in an image, thus creating numerous objects and segments of pixels within the image. The spectral information of the pixels within each of the object or segments is then analyzed to classify the object as either permeable or impermeable. This spectral information may include, as described above, various spectral bands of information such as R, G, B, and NIR bands of spectral information. This spectral information may be compared against known spectral information that is associated with various objects. For example, pixels in an image corresponding to a body of water may have distinct spectral characteristics. When analyzing imagery, pixels from within the image exhibiting these spectral characteristics may be classified as water. Such distinct spectral characteristics may be a certain ratio of spectral radiance of the NIR band compared to the blue (B) band, for example. Similarly all the pixels on a building rooftop, having similar spectral signatures may be merged into a single clusters or object. The image analysis for extraction of these impervious surfaces uses rules such as linear spectral response of man made objects in various spectral bands.

In the event that shadows are present in the image, a common occurrence is that the spectral characteristics of the shadow are similar to the spectral characteristics of water. This often results in shadows being confused with water by the spectral/spatial analysis algorithms. In one embodiment, image texture measures are used to differentiate water from shadows. Image texture generally refers to a spatial pattern in which pixels have some properties of homogeneity. In particular, the homogeneity among the pixels results not only from the presence of a particular color and/or intensity in the region but also the interaction of various colors and/or intensities. For example, texture features extracted from a scene of a field of grass describe a visual characteristic of grass fields which can be used to distinguish grass fields from trees in images, whereby color alone may not provide sufficient determination. Such texture analysis may be used to determine that a shadow is different than water. Other rules may also be used to classify shadows. For example, is a shadow is surrounded by pervious surfaces, the area within the shadow may be classified as a pervious surface. Similarly, if a shadow is surrounded by impervious surfaces, the area within the shadow may be classified as an impervious surface. As will be understood, other rules may be applied to determine the permeability of such shadowed area depending upon the scene and application.

With continuing reference to FIG. 4, at block 216, the parcel information is aggregated and pervious/impervious area associated with each parcel is determined. At block 220, the municipality is provided with parcel information including the pervious/impervious area associated with the various parcels from the parcel map. The information may be provided in any of a number of ways, such as, for example, electronic delivery via a distributed network such as the internet, delivery of a memory medium containing the parcel information, such as a compact disc, and the data may be delivered to a database associated with the customer, to name but a few. The municipality receiving the information may then generate storm water bills based on the information. The generation of bills may be done according to one of a number of available methods for billing property owners. For example, one municipality may bill customers for storm water management based on average parcel size and land use. Such a municipality may thus require simply a parcel size and a determination of the land use. Other municipalities may bill property owners based on actual property size and total impervious surface area contained within the property. Such a storm drainage bill may be calculated by mapping the impervious area within the parcel and determining the area of impervious surface in relation to the total area for the parcel. Still other municipalities may bill property owners based on a percentage of their parcel that contains impervious surface area. In such a case, the municipality calculates the bill by taking the area of impervious surface for each parcel and dividing by the total parcel area to determine a percentage of impervious area. This percentage is then used to determine that property's billing rate for impervious area on that property. In systems that provide billing based on the amount of impervious area per parcel, whether total impervious area or percentage impervious area, property owners receive bills according to their contribution to storm water runoff into the storm water runoff system.

Figure 5:
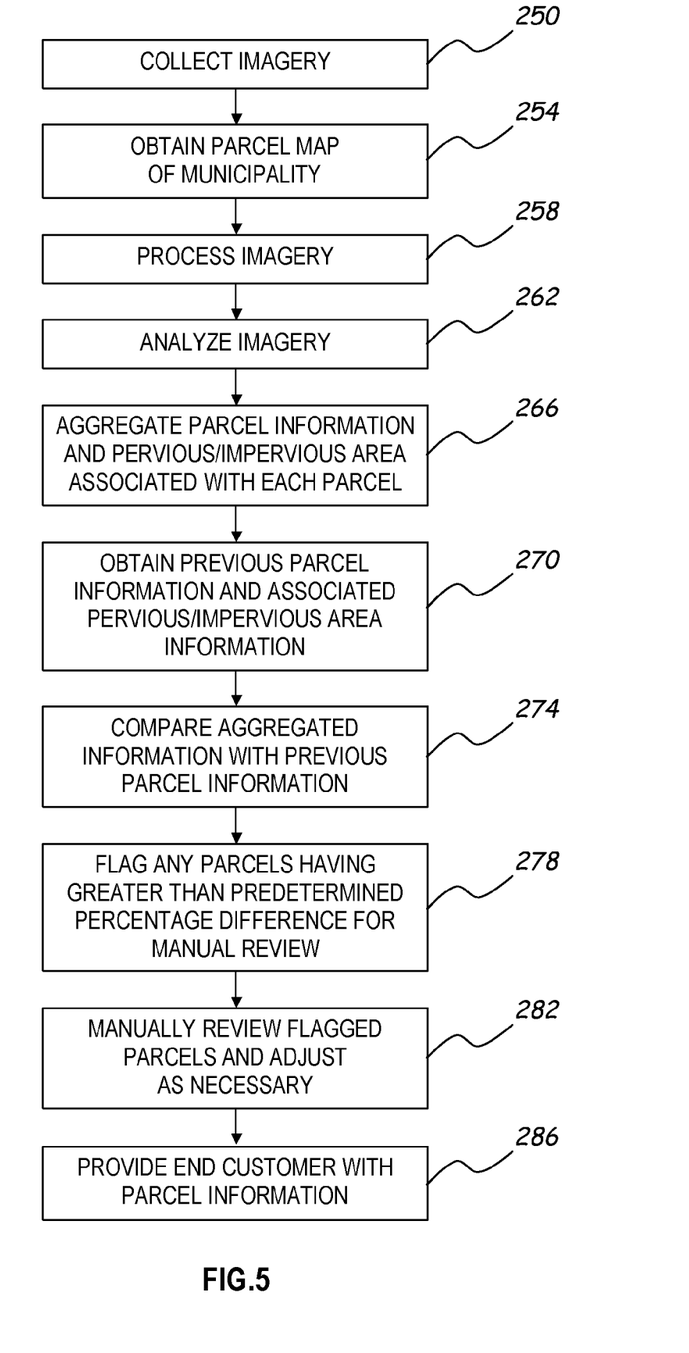
FIG. 5 is a block diagram illustration of the operational sets for determining impervious surface for another embodiment of the invention.

Referring now to FIG. 5, the operational steps for another embodiment of the invention are described. In this embodiment, initially, imagery is collected as indicated at block 250. As discussed above, such imagery may be collected using a satellite imaging system and/or an aircraft based imagery system, to name two examples. At block 254, similarly as described above, parcel map information for the municipality being imaged is obtained. At block 258, the imagery is processed according to the procedure described above. At block 262, the imagery is analyzed. The aggregated parcel information and pervious/impervious area associated with each parcel is determined at block 266. The operations of blocks 250-266 are as described above, and thus do not need further explanation here. At block 270, previous parcel information and associated pervious/impervious area information is obtained. Such previous information may include the municipality's latest information for the area of interest. For example, if a municipality had previously had an inspector physically inspect parcels in the area of interest, that information, including pervious/impervious surface area associated with each parcel, is provided. Similarly, if a municipality had previously done aircraft based or satellite based imaging of the area of interest, that information is provided. At block 274, the aggregated information is compared with the previous parcel information. This comparison compares the pervious/impervious area associated with each parcel between the two groups of information, and may be used to determine if any substantial changes have occurred. For example, a property owner may have constructed a new structure on a parcel, such as garage, thereby increasing the amount of impervious area on that particular parcel. In such a case, the property owner's bill should be adjusted to reflect the additional impervious area. At block 278, parcels having greater than a predetermined percentage difference are flagged for manual review. Such a manual review may reveal that a property owner has indeed constructed a new structure or removed a previously existing structure, and thus the bill for that customer should be changed. Furthermore, the manual review may indicate that an error had been made previously when determining the amount of impervious area associated with a parcel. In such a case, the error may be rectified and a further action taken by a municipality as necessary. Such a flag may also indicate that an error occurred when doing image processing and/or analysis, and may thus act as a quality check on the imagery. At block 282, the flagged parcels are manually reviewed and adjusted as necessary. For example, a large shadow may be present in the new imagery that was not present in the previous imagery, or that had been corrected in the previous imagery. In such a case, the manual review may identify that the shadow had been incorrectly analyzed and classified as a pervious surface when in actuality the surface is impervious. Such a manual review would provide a technician the opportunity to adjust such a determination. Similarly, such a manual review may indicate that a new structure has been constructed and therefore the storm water bill for the property should be adjusted. At block 286, the customer is provided with parcel information. Similarly as described above, the customer may be provided this information using one of a number of delivery mechanisms. The information may be provided, for example, by electronic delivery via a distributed network such as the internet, delivery of a memory medium containing the parcel information such as a compact disc, and the data may be delivered to a database associated with the customer through one of any available communication channels, to name but a few.

While the invention has been particularly shown and described with reference to embodiments thereof, it will be understood by those skilled in the art that various other changes in the form and details may be made without departing from the spirit and scope of the invention.

What is claimed is:

1. A method for determining pervious and impervious surfaces within parcels of a municipality, comprising:
obtaining a parcel map of a municipality;
obtaining an image of the municipality;
warping said image such that ground locations of the warped image correspond to ground locations of said parcel map;
analyzing at least one of spectral and spatial information from said image to determine pervious surfaces associated with one or more parcels from said parcel map;
obtaining an image from a previous time period;
warping said previous image to a parcel map provided by the municipality;
analyzing said previous image to determine pervious surfaces;
comparing pervious surfaces between said previous image and said image;
determining, for each parcel, a change in pervious surfaces; and
providing a report of parcels having a change greater than a predetermined percentage.

2. The method for determining pervious surfaces, as claimed in claim 1, wherein said parcel map has corresponding GIS information that is different than GIS information from said image.

3. The method for determining pervious surfaces, as claimed in claim 1, wherein said image comprises multiple spectral bands.

4. The method for determining pervious surfaces, as claimed in claim 3, wherein said spectral bands comprise a red band, a green band, a blue band, and a NIR band.

5. The method for determining pervious surfaces, as claimed in claim 4, wherein said analyzing step comprises: classifying a group of pixels from within said image as an object; classifying said object as pervious or impervious; determining an area of said object; determining a total area associated with a parcel; determining other objects within said parcel; and determining a total area of impervious surfaces within said parcel.

6. The method for determining pervious surfaces, as claimed in claim 5, wherein said object is classified using spectral information.

7. The method for determining pervious surfaces, as claimed in claim 1, further comprising: determining, for each parcel, an area of pervious surface and a total area; calculating a percentage of total parcel area that is impervious; and providing percentage information per parcel to the municipality.

* * * * *